United States Patent
Ochman et al.

(10) Patent No.: US 8,540,911 B2
(45) Date of Patent: Sep. 24, 2013

(54) METHODS OF MANUFACTURING POLYMER PIPETTES

(75) Inventors: Eitan Ochman, Kibbutz Metzer (IL); Omri Shoham, Kibbutz Metzer (IL)

(73) Assignee: Miniplast Ein-Shemer ACS Ltd., Kibbutz Ein-Shemer (IL)

( * ) Notice: Subject to any disclaimer, the term of this patent is extended or adjusted under 35 U.S.C. 154(b) by 0 days.

(21) Appl. No.: 13/295,137

(22) Filed: Nov. 14, 2011

(65) Prior Publication Data

US 2012/0121482 A1   May 17, 2012

Related U.S. Application Data

(60) Provisional application No. 61/414,013, filed on Nov. 16, 2010.

(51) Int. Cl.
*B01L 3/02* (2006.01)
*B29C 55/22* (2006.01)

(52) U.S. Cl.
USPC ..... 264/159; 264/288.4; 264/291; 264/297.8; 264/442; 422/501

(58) Field of Classification Search
None
See application file for complete search history.

(56) References Cited

U.S. PATENT DOCUMENTS

| | | | | |
|---|---|---|---|---|
| 4,212,204 | A * | 7/1980 | St. Amand | 73/864.11 |
| 4,530,712 | A * | 7/1985 | Kopf | 65/270 |
| 5,032,343 | A * | 7/1991 | Jeffs et al. | 264/320 |
| 5,240,397 | A * | 8/1993 | Fay et al. | 425/145 |
| 6,280,689 | B1 | 8/2001 | Stevens | |
| 6,363,750 | B1 * | 4/2002 | Chiodo | 65/108 |
| 7,794,664 | B2 | 9/2010 | Pelletier et al. | |
| 2003/0049179 | A1 * | 3/2003 | Snedden | 422/100 |

* cited by examiner

*Primary Examiner* — Benjamin Schiffman

(57) ABSTRACT

A method of generating a plurality of pipettes. The method comprises providing a tubular element, cutting the tubular element to form a plurality of two pipettes length components each having a length of about two target pipettes, simultaneously rotating the plurality of two pipettes length components, heating a central portion of each one of the rotated two pipettes length components, stretching each two pipettes length component to extend the respective central portion, and dividing each two pipettes length component at the extended central portion to form the two target pipettes.

7 Claims, 4 Drawing Sheets

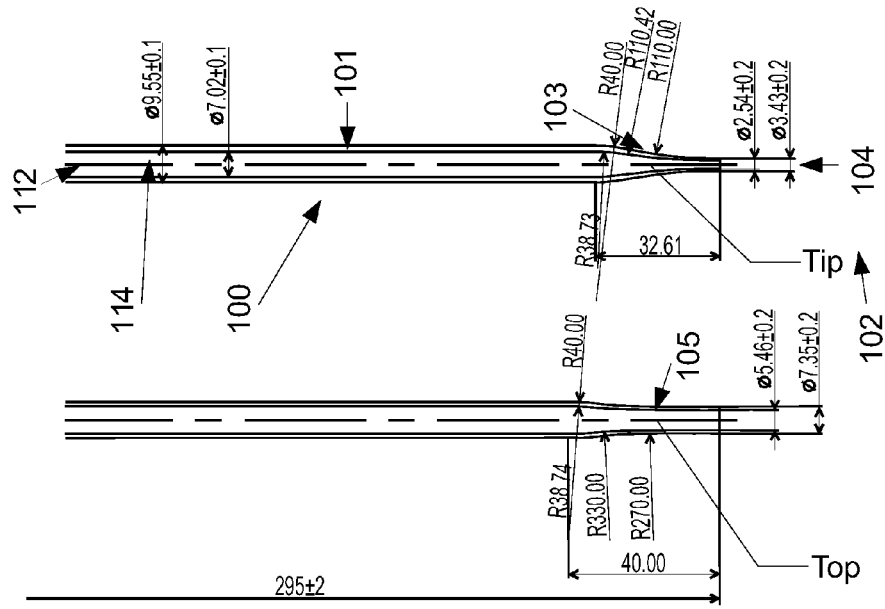
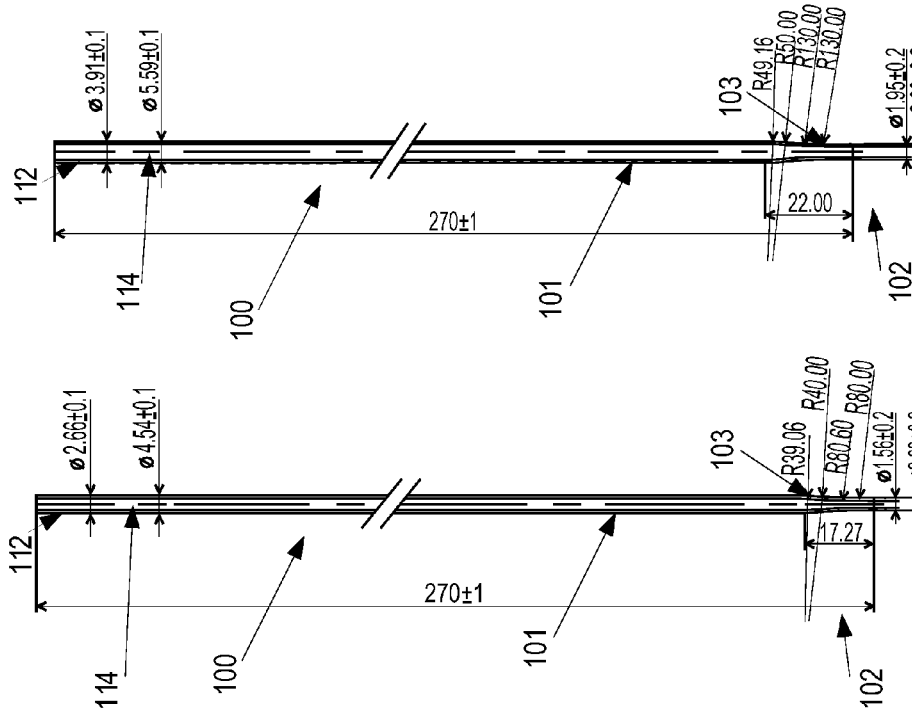

METHODS OF MANUFACTURING POLYMER PIPETTES

RELATED APPLICATION

This application claims the benefit of priority under 35 USC 119(e) of U.S. Provisional Patent Application No. 61/414,013 filed Nov. 16, 2010, the contents of which are incorporated herein by reference in their entirety.

FIELD AND BACKGROUND OF THE INVENTION

The present invention, in some embodiments thereof, relates to laboratory equipment and, more particularly, but not exclusively, to pipettes and methods of manufacturing thereof.

Pipettes, slender tubes used in laboratories to measure and transfer fluids, usually have cone-shaped hollow open tips which allow acquiring, transporting, and dispensing fluid samples. In use, at least the lower end of the pipette tip is placed in contact with a liquid to be sampled. The pipette is then operated to draw air from inside the pipette tip at the upper end, and the resultant suction draws the sampled liquid into the pipette tip. Air pressure maintains the liquid inside the pipette tip until the pipette is operated to release the liquid, generally by expelling the drawn air.

Improvements to pipettes and the respective manufacturing processes have been developed during the last years.

For example, U.S. Pat. No. 7,794,664 describes a pipette tip which includes a main body having an upper end, a lower end and a sidewall extending between the two ends. A bore extends axially through the main body between the upper and lower ends. The lower end has a bottom surface in which is formed a central opening that communicates with the axial bore to allow the passage of fluid therethrough. The bottom surface is formed with at least one groove that may be concentrically disposed or spirally disposed about the central opening. The at least one groove acts to inhibit fluid passing through the central opening from at least partially flowing along the outer surface of the sidewall from the central opening toward the upper end of the main body of the pipette tip.

Another example is provided in U.S. Pat. No. 6,280,689 which describes pipette for dispensing a fluid medium into an open-ended collection container including an improved dripless tip. The pipette includes a tip body with a cross shaped passage structure that spans the length of the tip body. This cross shaped passage structure is designed to contact the liquid medium that passes into the tip and onto the open distal end of the tip and prevent unwanted dripping therefrom.

SUMMARY OF THE INVENTION

According to some embodiments of the present invention, there is provided a pipette that comprises a tubular main body having an inner lumen with a first diameter and a tubular tip, integrally formed with the tubular main body, having an opening with a second diameter and a neck, including a shoulder, of at least 15 millimeter, the shoulder having a gradient of less than 60 radius (R). The second diameter is at least 40% of the first diameter.

Optionally, the tubular main body is sized to contain about 1 ml of fluids and the second diameter is at least about 1.6 mm.

Optionally, the tubular main body is sized to contain about 2 ml of fluids and the second diameter is at least about 2 mm.

Optionally, the tubular main body is sized to contain about 5 ml of fluids and the second diameter is at least about 2.5 mm.

Optionally, the tubular main body is sized to contain about 10 ml of fluids and the second diameter is at least about 2.8 mm.

Optionally, the tubular main body is sized to contain about 25 ml of fluids and the second diameter is at least about 4.5 mm.

Optionally, the tubular tip is cut by an ultrasonic blade.

According to some embodiments of the present invention, there is provided a method of generating a plurality of pipettes. The method comprises providing a tubular element, cutting the tubular element to form a plurality of two pipettes length components each having a length of about two target pipettes, simultaneously rotating the plurality of two pipettes length components, heating a central portion of each the rotated two pipettes length component, stretching each the two pipettes length component to extend respective the central portion, and dividing each the two pipettes length component at the extended central portion to form the two target pipettes.

Optionally, at least one of the heating, the rotating, the stretching, and the dividing is adjusted to the dimensions of the plurality of two pipettes length components.

Optionally, the rotating is performed in front of a heating element performing the heating.

Optionally, the method further comprises cooling the plurality of two pipettes length components after the stretching.

Optionally, the dividing is performed using an ultrasonic blade.

Optionally, the rotating is performed during the stretching.

Optionally, the method further comprises heating left and right ends of each the two pipettes length component, the stretching comprises stretching each the two pipettes length component to extend respective the left and right ends so as to form a mouthpiece shape in each the end.

According to some embodiments of the present invention, there is provided a method of generating a plurality of pipettes. The method comprises providing a tubular element, heating a portion of each the tubular component, stretching the portion to form at least one pipette tip shape sub portions, and using an ultrasonic blade to cut the tubular element at the portion.

Optionally, the method further comprises cooling the portion dafter the stretching.

According to some embodiments of the present invention, there is provided a manufacturing arrangement for generating a plurality of pipettes. The manufacturing arrangement comprises a tube manufacturing unit which receives and cuts a tubular element to form a plurality of two pipettes length components each having a length of about two target pipettes, a rotation mechanism which rotates the plurality of two pipettes length components simultaneously, at least one heating element which heats a central portion of each the rotated two pipettes length component, a stretching mechanism which stretches each the two pipettes length component to extend respective the central portion, and a cutting unit which divides each the two pipettes length component at the extended central portion to form the two target pipettes.

Optionally, the at least one heating element is shaped to encircle about a half of the cross sectional diameter of each the two pipettes length component.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-1B are schematic illustrations of main body and tip of exemplary pipettes, according to some embodiments of the present invention;

FIGS. 1C-1E are schematic illustrations of main body, top and tip of exemplary pipettes, according to some embodiments of the present invention;

DESCRIPTION OF EMBODIMENTS OF THE INVENTION

Figure 1D:
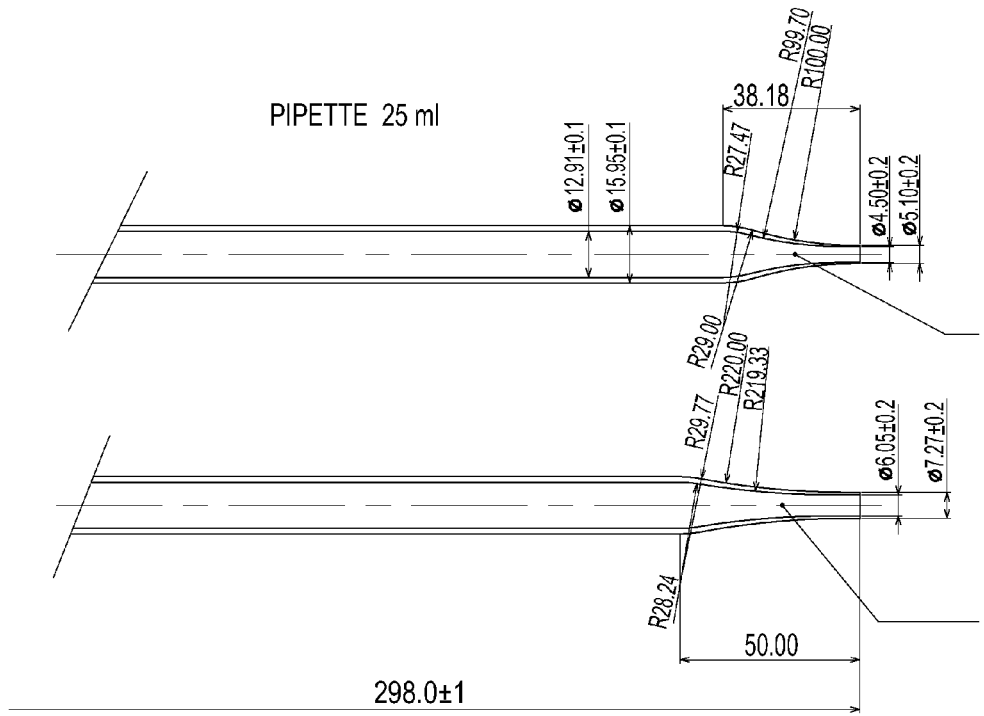

The present invention, in some embodiments thereof, relates to laboratory equipment and, more particularly, but not exclusively, to pipettes and methods of manufacturing thereof.

According to some embodiments of the present invention, there is provided a pipette which comprises a tubular main body having an inner lumen with a certain diameter and a tubular tip, integrally formed with the tubular main body, having an opening and a neck of at least 15 millimeter long, including a shoulder. The shoulder has a gradient of less than 60 radius (R) and the diameter of the opening is at least 40% of the diameter of the inner lumen of the tubular main body in 1 ml, 2 ml, and 5 ml pipettes and at least 30% of the diameter of the inner lumen of the tubular main body in 10 ml and 25 ml, pipettes. The pipette may be for example a 1 milliliter (ml), a 2 ml, a 5 ml, a 10 ml or a 25 ml pipette. The pipette may be a volumetric pipette, measuring pipette, Mohr pipette and/or serological pipette.

According to some embodiments of the present invention, there is provided a manufacturing arrangement and a method of generating a plurality of pipettes. The method is based on a tubular element that is optionally generated by extrusion. The tubular element is cut to a plurality of tubular components which has the length of about two target pipettes. Then these tubular components are rotated. During the rotating the central portion of each tubular component, and optionally their left and right ends, are heated. This allows stretching the tubular component to extend the heated central portion and optionally the heated left and right ends. This extending forms the shapes of the tips and optionally the shapes of the mouthpieces as outlined above and described below. Now, each of the two pipettes length components is divided, at the extended central portion, to form two target pipettes. The dividing is optionally performed by an ultrasonic blade. The dividing form tips as outlined above and described below.

According to some embodiments of the present invention, there is provided a method of generating a plurality of pipettes. The method is based on a tubular element that is optionally cut to two pipettes length components as outlined above and described below. A portion of the tubular component, or optionally of each two pipettes length component, is heated and stretched to form one or more pipette tip shape sub portions.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1E:
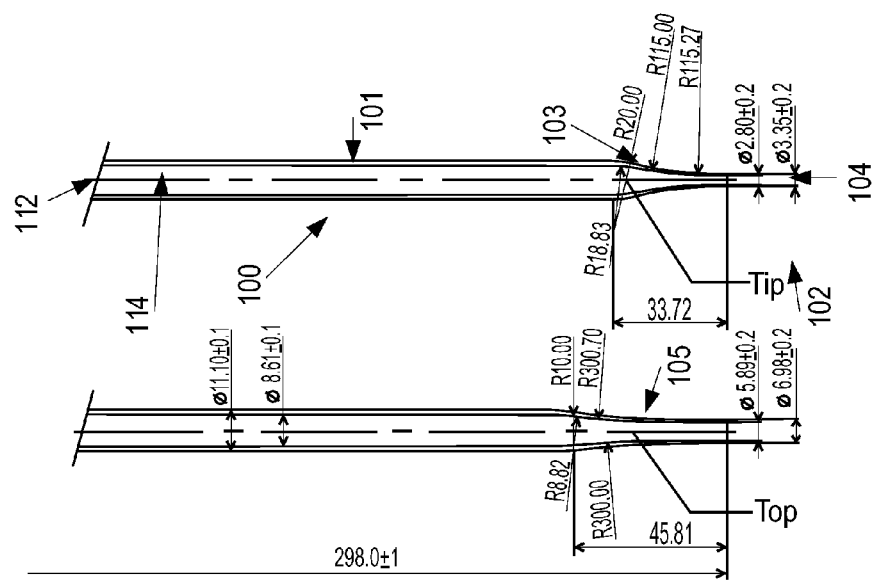

Reference is now made to FIGS. 1A-1B, which are schematic illustrations, each of a part of a main body 101 and a tip 102 of an exemplary pipette 100 and to FIGS. 1C-1E, which are schematic illustrations, each of the part of a main body 101, the tip 102 and the top 105 (mouthpiece) of an exemplary pipette 100, according to some embodiments of the present invention. Within the tubular main body 101, a pipette interior lumen 114 is defined for accommodating a given volume of fluid medium. In order to aspirate and dispense fluid medium, the pipette 100 includes the tubular tip 102 at one end of the tubular main body 101 and a mouthpiece 105 at the other end, both in communication with the pipette interior lumen 114 so as to permit aspirating and dispersing of the fluid medium by creating a selective pressure differential within the pipette interior lumen 114. Such a pressure differential is created, manually by opening and closing mouthpiece 105, and/or by use of mechanical means. It should noted that the pipette a volumetric pipette, measuring pipette, Mohr pipette and/or serological pipette.

The tip 102 of the pipettes 100, which is tubular, has a relatively wide opening 104, for example having a diameter that is wider than a quarter of the diameter of inner lumen of the respective main body 101 of the pipette 100, for example more than about 40% and more than about 50%. As used herein, opening means inside diameter at the end of the tip 102. The tip 102 of the pipettes 100 has a relatively thin neck (outer diameter), for example having a diameter that is narrower than about 40% of the diameter of the respective main body 101 in 5 ml, 10 ml and 25 ml pipettes, for example narrower than about 33.3%, and narrower than about 70% of the diameter of the respective main body 101 in 1 ml and 2 ml pipettes. The tip 102 of the pipettes 100 has a relatively long neck (including shoulder), of between about 15 mm in a 1 ml pipette and about 45 mm in a 25 ml pipette.

For example, 1 ml and 2 ml pipettes have a length of more than 5% of the total length of the respective the pipette 100. For example 5 ml, 10 ml, and 25 ml pipettes have a length of more than 8% of the total length of the respective the pipette 100, for example narrower more than 11%, more than 12%, and more than more than 13% of the total length of the respective the pipette 100. The pipette 100 is optionally defined by a tubular wall 112 of generally uniform wall thickness. The pipette 101 may be formed of molded transparent or semi transparent, for example tinted, polymer such as polystyrene.

For example, FIG. 1A depicts a 1 milliliter (ml) pipette the diameter of the tubular main body 101 is about 4.53 mm (inner lumen 2.66 mm), the length is 270 mm, and at the tubular tip 102, the diameter of the opening is about 1.56 mm, the length of the neck 121 with the shoulder is about 17.27 mm, and the angle of the shoulder is about 80R or less. In another example, depicted in FIG. 1B, a 2 ml pipette is depicted. The tubular main body 101 of the pipette has a diameter of about 5.59 mm (inner lumen 3.91 mm), the length is 270 mm, and at the tubular tip 102, the diameter of the opening is about 1.95 mm, the length of the neck 121 with the shoulder is about 22.00 mm, and the angle of the shoulder is about 130 radius (R) or less. In another example, depicted in FIG. 1C, a 5 ml pipette is depicted. The tubular main body 101 of the pipette has a diameter of about 9.55 mm (inner lumen 7.02 mm), the length is about 295 mm, and at the tubular tip 102, the diameter of the opening is about 2.54 mm, the length of the neck 121 with the shoulder is about 32.61 mm, and the angle of the shoulder is about 110R or less. In another example, depicted in FIG. 1D, a 10 ml pipette is depicted. The tubular main body 101 of the pipette has a diameter of about 11.10 mm (inner lumen 8.61 mm), the length is 298 mm, and at the tubular tip 102, the diameter of the opening is about 2.80 mm, the length of the neck 121 with the shoulder is about 33.72 mm, and the angle of the shoulder is about 115R or less. In another example, depicted in FIG. 1E, a 25 ml pipette is depicted. The tubular main body 101 of the pipette has a diameter of about 15.95 mm (inner lumen 12.91 mm), the length is 298 mm, and at the tubular tip 102, the diameter of the opening is about 4.50 mm, the length of the neck 121 with the shoulder is about 38.18 mm, and the angle of the shoulder is about 100R or less.

Pipettes, which are sized and shaped as described above, permit aspirating and dispersing of relatively thick fluid medium in a relatively short period. For example, a 2 ml pipette aspirates chocolate pudding (branded Danny in Israel) in 29.34 seconds and disperses same the chocolate pudding in 3.8 seconds. In another example, a 5 ml pipette aspirates the same chocolate pudding in 9.85 seconds and disperses same the chocolate pudding in 2.87 seconds. In another example, a 10 ml pipette aspirates the same chocolate pudding in 32.04 seconds and disperses same the chocolate pudding in 5.68 seconds. In another example, a 25 ml pipette aspirates the same chocolate pudding in 18.27 seconds and disperses same the chocolate pudding in 4.63 seconds.

Figure 2:
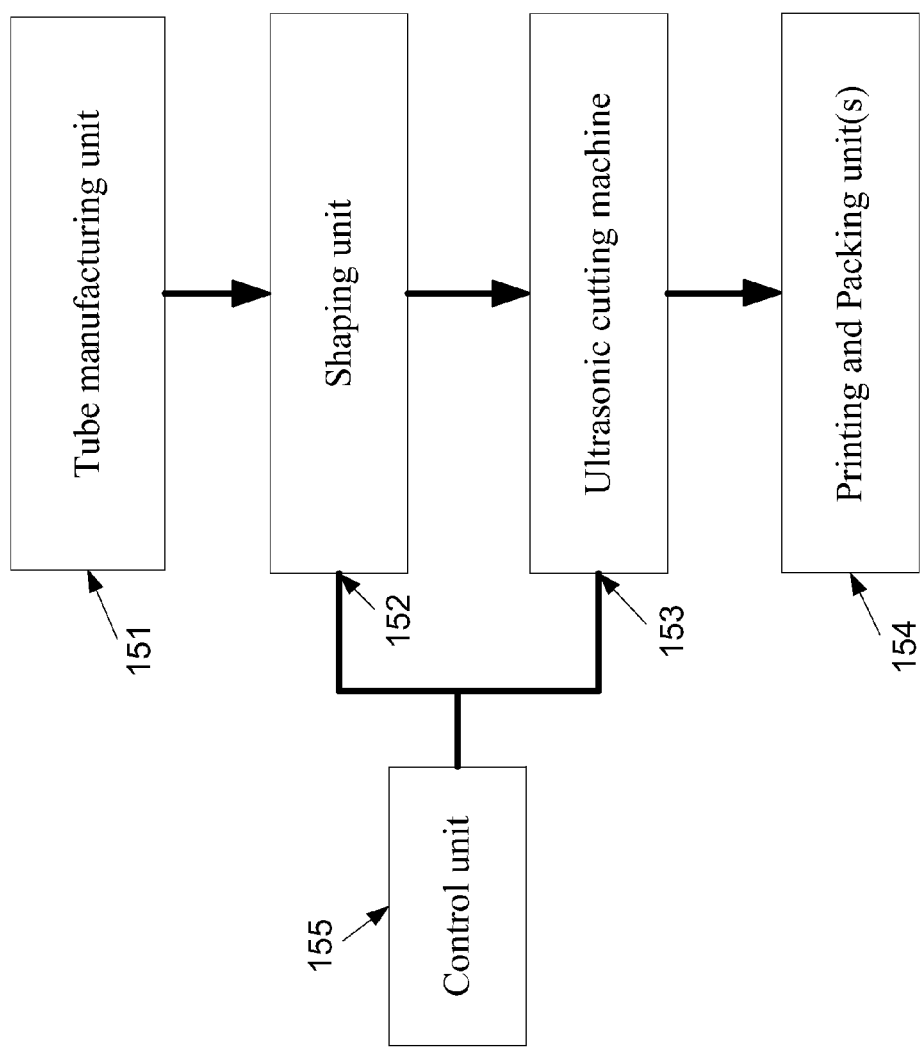
FIG. 2 is a schematic illustration of the units participating in the manufacturing of the pipettes, according to some embodiments of the present invention.
Figure 3:
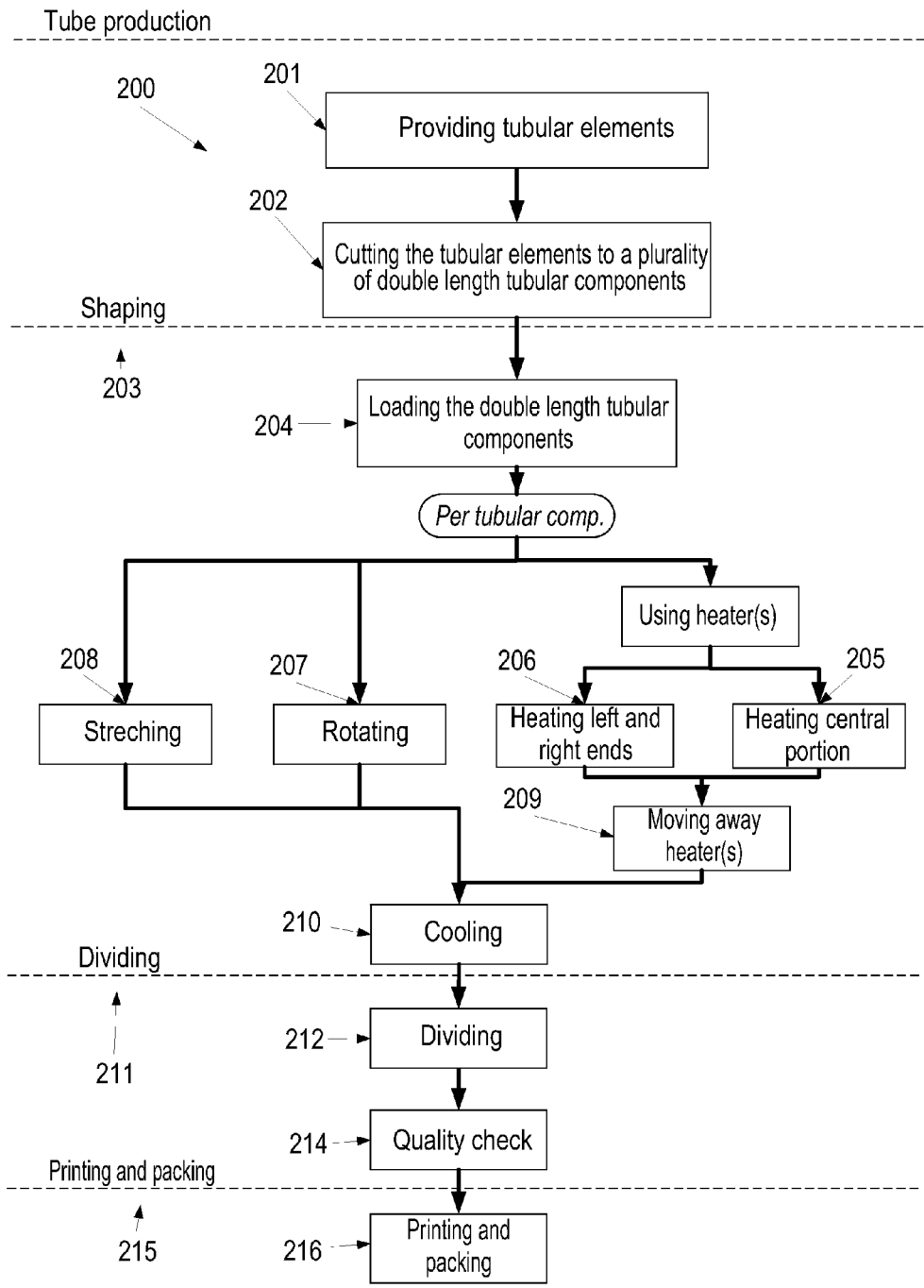
FIG. 3 is a flowchart of a method for producing such pipettes, each for example as depicted in FIGS. 1A-1E, according to some embodiments of the present invention.

Reference is now made to FIG. 2 which is a schematic illustration of the units participating in the manufacturing of the pipettes, such as the one depicted in FIGS. 1A-1E and described above and to FIG. 3, which is a flowchart 200 of a method for producing such pipettes, each for example as depicted in FIGS. 1A-1E, according to some embodiments of the present invention.

First, as shown at 201, one or more tubular elements, each having a relatively uniform diameter, are provided, for example manufactured by extrusion at a tube manufacturing unit 151. As used herein, a relatively uniform diameter is a tubular element having an inner lumen diameter deviation of no more than 0.25 millimeter (mm). The degree of deviation from perfect circularity of the cross section of the tubular element is optionally low, for example no more than 1.5 mm, for example no more than about 0.8 mm.

Then, as shown at 202, the tubular element is cut to form a plurality of tubular components, each about two-pipettes long. For example, each two pipettes length component is between about 0.50 meter (m) and 0.6666 m long. For brevity, each such tubular component is referred to herein as a two pipettes length component.

Optionally, as some at 203, the two pipettes length components are now forwarded to a cutting and shaping unit 152.

Now, as shown at 204, a plurality of two pipettes length components are loaded onto a holder in a working space. Optionally, the holder is set to align the two pipettes length components in the working space. Each two pipettes length component is held in an area referred to herein as a working position. The number of loaded two pipettes length components may vary from few to few dozens to few hundreds, depending on the number of working positions of the holder. Optionally, the alignment of the two pipettes length components is verified by an image processing module, for example according to images captured by one or more image sensors.

As shown at, 205, the central portion of each two pipettes length component, at each working position, is heated. Optionally, the heating is applied, sequentially or in parallel, also to the left and right ends of the two pipettes length component, as shown at 206. The heating at the central portion, and optionally in the ends, is applied by one or more heating elements. Optionally, two heating elements are placed one in front of the other. Each heating element is sized and shaped to encircle at least about half of the cross sectional diameter of the two pipettes length components, for example with a heating lumen having a diameter of about 0.2 cm, 0.5 cm, 0.8 cm, 1.5 cm and 3 cm and/or any intermediate or larger diameter. The length of each heating element is adjusted to the length of the tip end, and optionally mouthpiece end, of a desired pipette. Optionally, the heating is monitored by temperature sensors. Optionally, the heating elements increase the temperature of the central portions, and optionally the ends, of the two pipettes length components to between about 150° C. and about 350° C. Optionally, the heating time at the central portion is between 10 seconds and 2.5 minutes.

Optionally, the heating time at the ends is between 10 seconds and 2.5 minutes.

As shown at 207, optionally during the heating, the two pipettes length components are rotated around their axes in a controlled pace, for example between 1 and 30 rounds per minute. The rotating may be performed by a motor, a set of gearwheels, and cylindrical rolling elements, as known in the art.

As shown at 208, in each working position, a respective two pipettes length component is stretched. The stretching is optionally made by applying tension on the left and right ends. The stretching is optionally made, at least partly, when the two pipettes length components are rotated. The stretching extends the central portion of the two pipettes length component, forming two sub portions which are shaped as a tubular pipette tip, for example as any of the aforementioned tubular tips.

The stretching, the heating, and/or the rotating are optionally controlled by the control unit 155. The stretching, the heating, and/or the rotating may be adjusted for manufacturing different pipettes, by the control unit 155, according to a manufacturing plan.

Optionally, two opposing heating elements are sized and shaped to form apertures in which the two pipettes length component is placed. The apertures are formed according to the diameter of the two pipettes length components.

Optionally, as shown at 209, the heating elements are moved away from the two pipettes length components.

Optionally, as shown at 210, the stretched two pipettes length components are cooled down, for example by flowing cooled air, using fans and/or air nozzles. The flowing cooled air accelerates the solidification of the stretched two pipettes length components. The rotating may be maintained during the cooling. The cooling period is optionally between about 10 seconds and 1 minute.

Now, as shown at 210, the stretched two pipettes length components are forwarded to a dividing area 211.

At the dividing area 211, as shown at 212, each one of the stretched two pipettes length components is divided at the central portion.

Optionally, the dividing is performed using an ultrasonic cutting machine 153. For example, the ultrasonic cutting machine is an ultrasonic cutting. The dimensions, geometry of the blade, and/or working amplitude of the ultrasonic cutting machine are optionally adjusted to the dimensions of the cut stretched two pipettes length component.

The cutting using n ultrasonic blade reduces or eliminates the number of fragile areas in proximity to the tip and/or plastic dust carryover.

Optionally, the left and right ends are also cut. The cutting of the left and right ends may be done simultaneously with the dividing of the stretched double length tubular at the central portion. For example, the cutting of the left and right ends is made using a shaped blade. Optionally, the blades for cutting of the left and right ends and the blade for cutting the central portion are mounted on a common holder and set to cut the stretched two pipettes length components at the respective working position simultaneously.

According to some embodiments of the present invention, as shown at 211, the dividing process, depicted in 212, is monitored, for example by an image process unit. For example, the image process unit images the location of each stretched two pipettes length component in relation to a respective blade and operates a mechanical arm to reposition stretched two pipettes length component.

Optionally, as shown at 214, a quality check is made after each one of the stretched two pipettes length components is divided to two-pipettes.

Optionally, as shown at 215, the pipettes are forwarded to a printing and packing units 154 which prints a scale on the external walls of pipettes and packs the pipettes, for example as known in the art. Optionally, static electricity is dismantled before the printing. Optionally, a filter is placed in each one of the pipettes before the packing thereof. Optionally, each one of the pipettes is sterilized, for example using Gamma radiation, after the packing thereof. The printing and packing are depicted by numeral 216.

It is expected that during the life of a patent maturing from this application many relevant systems and methods will be developed and the scope of the term heating element, stretching element, actuator, and ultrasonic blade is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", an and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of generating a plurality of polymer pipettes, comprising:
   providing a tubular element;
   cutting said tubular element to form a plurality of two pipettes length components each having a length of about two target pipettes;
   simultaneously rotating said plurality of two pipettes length components;
   heating a central portion of each said rotated two pipettes length component;
   stretching each said two pipettes length component to extend respective said central portion; and
   dividing each said two pipettes length component at said extended central portion to form said two target pipettes.

2. The method of claim 1, wherein at least one of said heating, said rotating, said stretching, and said dividing is adjusted to the dimensions of said plurality of two pipettes length components.

3. The method of claim 1, wherein said rotating is performed in front of a heating element performing said heating.

4. The method of claim 1, further comprising cooling said plurality of two pipettes length components after said stretching.

5. The method of claim 1, wherein said dividing is performed using an ultrasonic blade.

6. The method of claim 1, wherein said rotating is performed during said stretching.

7. The method of claim 1, further comprising heating left and right ends of each said two pipettes length component, said stretching comprises stretching each said two pipettes length component to extend respective said left and right ends so as to form a mouthpiece shape in each said end.

* * * * *